United States Patent
Suvanto et al.

[11] Patent Number: 6,002,825
[45] Date of Patent: Dec. 14, 1999

[54] OPTICAL CABLE

[75] Inventors: Markku Suvanto, Espoo; Vesa Tuunanen, Helsinki, both of Finland

[73] Assignee: NK Cables Oy, Espoo, Finland

[21] Appl. No.: 08/983,095

[22] PCT Filed: Jun. 19, 1996

[86] PCT No.: PCT/FI96/00345

§ 371 Date: Mar. 19, 1998

§ 102(e) Date: Mar. 19, 1998

[87] PCT Pub. No.: WO96/42028

PCT Pub. Date: Dec. 27, 1996

[30] Foreign Application Priority Data

Jun. 12, 1995 [FI] Finland ................... 952878

[51] Int. Cl.$^6$ ................................................. G02B 6/44
[52] U.S. Cl. ........................... 385/111; 385/109; 385/113
[58] Field of Search ................... 385/109, 111, 385/113, 100

[56] References Cited

U.S. PATENT DOCUMENTS

| | | | |
|---|---|---|---|
| 4,420,220 | 12/1983 | Dean et al. ........................... | 385/109 |
| 4,514,035 | 4/1985 | Steinmann et al. ..................... | 385/103 |
| 4,770,489 | 9/1988 | Saito et al. .............................. | 385/109 |
| 4,875,757 | 10/1989 | Greveling ............................. | 350/96.23 |
| 5,320,788 | 6/1994 | Schneider et al. ...................... | 264/1.5 |
| 5,345,525 | 9/1994 | Holman et al. ......................... | 385/104 |

FOREIGN PATENT DOCUMENTS

| | | | |
|---|---|---|---|
| 0136913 | 4/1985 | European Pat. Off. ............... | 385/109 |
| 0461871 | 12/1991 | European Pat. Off. ............... | 385/103 |
| 91680 | 6/1986 | Finland ................................. | 385/103 |

*Primary Examiner*—Rodney Bovernick
*Assistant Examiner*—Victoria D. Hao
*Attorney, Agent, or Firm*—Ladas & Parry

[57] ABSTRACT

The invention relates to an optical cable comprising a reinforcing structure (1) for providing sufficient tensile and compression strength for the cable, and one or more longitudinally extending fibre channels (4) in which optical fibres in the form of single fibres (2), fibre bundles or fibre ribbons are positioned. In the cable of the invention, the fibre channel/fibre channels (4) is/are defined directly by said reinforcing structure (1), and the reinforcing structure is made of plastic reinforced with fibre bits (3).

3 Claims, 1 Drawing Sheet

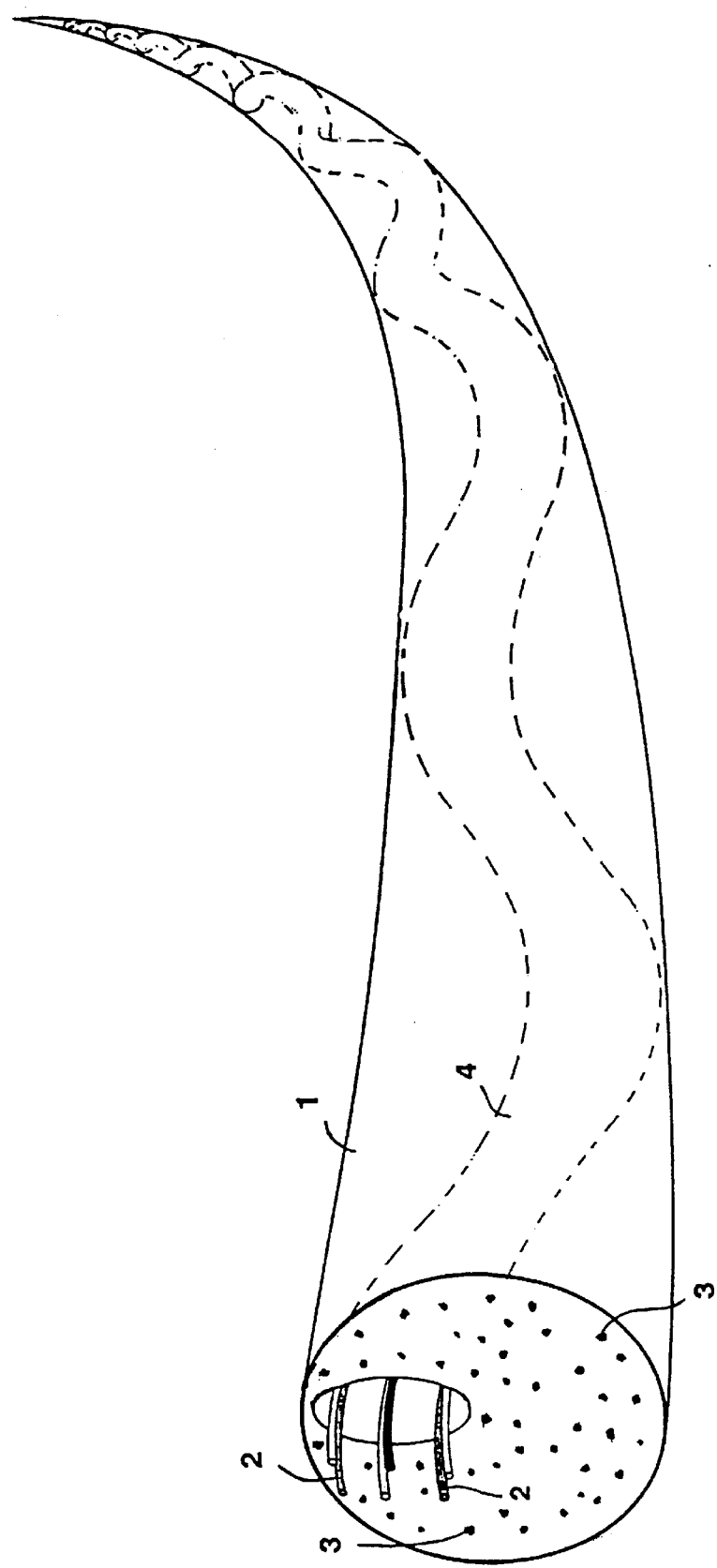

OPTICAL CABLE

FIELD OF THE INVENTION

The invention relates to an opt al cable comprising a reinforcing structure for providing sufficient tensile and compression strength for the cable, and one or more longitudinally extending fibre channels in which optical fibres in the form of single fibres, fibre bundles or fibre ribbons are positioned.

BACKGROUND AND PRIOR ART

An optical cable of the type described above is known, for example, from European Patent No. 0 136 913. According to this publication, optical fibres are placed in secondary sheathing tubes reinforced with glass fibres, and these secondary sheathing tubes are positioned around a central strength and support member. The cable thus requires secondary sheathing tubes reinforced with glass fibres and a separate strength and support member, although the cable may be thinner than conventional cables, since the secondary sheathing tubes reinforced with glass fibres contribute to the tensile strength of the cable. Such elements for receiving tensile and compression stresses are necessary simply because the coefficient of heat expansion of the plastic material in the secondary sheathing tube is high as compared with the almost nonexistent heat expansion of optical fibres.

As the aim has been metal-free optical cables, constructions similar to the one disclosed in European Patent No. 0 136 913 cited above have been provided wherein elements with tensile strength are positioned in a cable or its sheathing, e.g. in the form of longitudinally oriented bundles of glass, carbon or plastic fibres. Such fibre-reinforced cables are known, for instance, from Finnish Patent No. 91 680 and European Patent Application No. 0 461 871. The problem with the fibre-reinforced cables of these publications is that they are complicated and expensive to manufacture. The fibre bundles must at first be twisted around the cable core and then be impregnated with plastic, hot-melt adhesive or the like to provide an integral sheathing. This renders the manufacturing process of the cable complicated and expensive.

SUMMARY OF THE INVENTION

The object of the present invention is to provide an optical cable which avoids the problems associated with the above-mentioned known constructions. This is achieved with a cable of the invention, which is characterized in that the fibre channel/fibre channels is/are defined directly by said reinforcing structure, and that the reinforcing structure is made of plastic reinforced with fibre bits.

Although the fibre channel or fibre channels may be conventional straight cylindrical channels, the fibre channel is preferably arranged to extend spirally in the reinforcing structure to provide the fibres in the fibre channel with extra length as compared with the length of the reinforcing structure.

When a spiral fibre channel, for example, is used, the amount of material in the reinforcing structure is naturally so large that, when it is made of plastic reinforced with fibre bits, sufficient tensile and compression strength is provided for the cable without further operations.

The fibre bits are preferably bits of mineral, glass, plastic or similar fibres, or mixtures of such fibre bits.

Selecting a suitable material and properties for the fibres and, optionally, using combinations of different fibres provides a reinforcing structure which, in addition to the necessary tensile properties, also has the compression strength required by thermal stability in the longitudinal direction and a suitable coefficient of heat expansion. Furthermore, the reinforcing structure can be provided with a desired impact resistance, transverse strength and suitable flexibility so that the cable can be handled in the conventional manner.

Preferably, the reinforcing structure reinforced with fibre bits is extruded in one process step from plastic in which fibre bits are embedded.

The advantages of the cable of the invention particularly if the cable comprises a spiral channel within the reinforcing structure—are small size, good flexibility in all directions, metal-free construction and the fact that it can be manufactured in one sheathing step.

BRIEF DESCRIPTION OF THE DRAWING

In the following, the optical cable of the invention will be described in greater detail with reference to the sole FIGURE of the accompanying drawing, which shows a cross-section of an illustrative embodiment of the optical cable of the invention.

DETAILED DESCRIPTION

The FIGURE of the drawing shows an embodiment of the optical cable of the invention where a fibre channel 4 extending spirally in the longitudinal direction of the cable is provided within a reinforcing structure 1 for optical fibres 2. The fibre channel is typically filled with grease or a similar substance to prevent moisture from entering the fibre channel and being transferred therein. Such a fibre channel is known in principle from Finnish Patent No. 86 481. As distinct from this known structure, the material from which the reinforcing structure 1 of the cable is extruded according to the present invention is plastic in which fibre bits 3 and optionally other additives required by the application are embedded to make the cable weather-resistant or waterproof or, for instance, to protect the cable against rodents. The fibre bits embedded in the reinforcing structure 1 may be, for example, staple fibre the material of which may vary depending on the desired properties of the reinforcing structure 1. The most typical fibre materials are mineral, glass and plastic fibres. It is possible to use all known fibrous materials with good tensile strength and poor heat expansion properties. Various carbon fibres, glass fibres, and also high-aromatic polyamide fibres (aramid) are thus suitable for use in the cable of the invention.

In practice, the fibre type or mixture of fibre types to be used depends, on the one hand, on the desired properties of the cable and, on the other hand, on the price of the different fibre types. It is, however, obvious that selecting the thicknesses and lengths of fibres and also their number in the reinforcing structure suitably and, optionally, using combinations of different fibre types produces the desired result as regards the tensile properties and the compression strength required by thermal stability in the longitudinal direction; in addition, a sufficiently low coefficient of heat expansion is achieved. Naturally, the reinforcing structure should also have suitable properties as regards impact resistance and transverse strength. Furthermore, the reinforcing structure should be so flexible that it can be easily handled in the same way as conventional cables.

As appears from the above, the reinforcing structure of the optical cable of the invention has such properties that a cable provided with it is suitable as such for use as an optical cable. The material of the reinforcing structure should be sufficiently weather-resistant so that it is applicable as such for use under varying environmental conditions.

The suitability of the reinforcing structure of the invention as such for use as a cable structure is partly based on the relatively large amount of material in the reinforcing structure as compared with the fibre channels positioned therein, particularly when the reinforcing structure contains only one spirally extending fibre channel. It will be obvious that the structure of the invention allows a completely metal-free optical cable to be achieved in a very simple manner. It will also be obvious that, if desired, various protective layers of plastic can be provided on top of the reinforcing structure of the optical cable of the invention, for instance to improve the waterproofness and weather-resistance of the sheathing. Furthermore, it will be obvious that, instead of one spiral fibre channel, there may be a plurality of fibre channels, and that they may also be cylindrical or have some other kind of cross-section.

In the above, the optical cable of the invention has been described merely by means of one illustrative embodiment. It will be obvious that the cable of the invention can be modified considerably without, however, departing from the scope and spirit of the invention disclosed in the appended claims.

What is claimed is:

1. An optical cable comprising a reinforcing structure (1) for providing sufficient tensile and compression strength for the cable, and one or more longitudinally extending fibre channels (4), in which optical fibres in the form of single fibres (2), fibre bundles or fibre ribbons are positioned, said one or more fiber channels being defined directly by said reinforcing structure (1), the reinforcing structure being made of plastic reinforced with fibre bits (3), said fibre bits being made of mineral, glass, plastic or similar fibres, or mixtures of such fibre bits, said reinforcing structure, reinforced with said fibre bits, being extruded in one process step from plastic in which said fibre bits are embedded to form said reinforcing structure for said optical fibres capable of resisting tension.

2. An optical cable according to claim 1, characterized in that the fibre channel (4) is arranged to extend spirally in the reinforcing structure (1) to provide the fibres in the fibre channel with extra length as compared with the length of the reinforcing structure.

3. An optical fibre according to claim 1, wherein said reinforcing structure is a one piece extruded body containing said fibre bits and usable, as such, to contain said optical fibres and provide the tensile and compressive strength for the optical cable without any additional reinforcing sheathing.

* * * * *

UNITED STATES PATENT AND TRADEMARK OFFICE

CERTIFICATE OF CORRECTION

PATENT NO. : 6,002,825
DATED : December 14, 1999
INVENTOR(S) : Markku SUVANTO, Vesa TUUNANEN It is certified that error appears in the above-identified patent and that said Letters Patent are hereby corrected as shown below:

ON THE TITLE PAGE, ITEM 22, THE CORRECT FILING DATE IS JUNE 11, 1996

Claim 3, line 1 (Column 4, line 21) "fibre" should read --Cable--

Signed and Sealed this

Tenth Day of October, 2000

*Attest:*

Q. TODD DICKINSON

*Attesting Officer*  *Director of Patents and Trademarks*